(12) United States Patent
Bahl et al.

(10) Patent No.: US 11,627,075 B2
(45) Date of Patent: Apr. 11, 2023

(54) STITCHING MULTIPLE WIDE AREA NETWORKS TOGETHER

(71) Applicant: Microsoft Technology Licensing, LLC, Redmond, WA (US)

(72) Inventors: Paramvir Bahl, Bellevue, WA (US); Ryan Andrew Beckett, Redmond, WA (US); Abhishek Udupa, Bellevue, WA (US); Sharad Agarwal, Bellevue, WA (US); Rachee Singh, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/377,088

(22) Filed: Jul. 15, 2021

(65) Prior Publication Data

US 2023/0016213 A1     Jan. 19, 2023

(51) Int. Cl.
*H04L 45/42* (2022.01)
*H04W 40/20* (2009.01)

(52) U.S. Cl.
CPC .............. *H04L 45/42* (2013.01); *H04W 40/20* (2013.01)

(58) Field of Classification Search
CPC ....... H04L 45/00; H04L 45/302; H04L 45/42; H04W 40/02; H04W 40/12; H04W 40/20
See application file for complete search history.

(56) References Cited

U.S. PATENT DOCUMENTS

| | | | |
|---|---|---|---|
| 2001/0019554 A1* | 9/2001 | Nomura | H04L 45/50 370/392 |
| 2004/0117339 A1 | 6/2004 | Thubert et al. | |
| 2008/0002588 A1* | 1/2008 | McCaughan | H04L 47/10 370/238 |
| 2009/0319502 A1* | 12/2009 | Chalouhi | H04L 67/104 |

(Continued)

FOREIGN PATENT DOCUMENTS

| | | |
|---|---|---|
| WO | 2014147197 A1 | 9/2014 |
| WO | 2020112345 A1 | 6/2020 |

OTHER PUBLICATIONS

"Non Final Office Action Issued in U.S. Appl. No. 17/358,737", dated Aug. 5, 2022, 18 Pages.

(Continued)

*Primary Examiner* — Jeong S Park
(74) *Attorney, Agent, or Firm* — ArentFox Schiff LLP

(57) ABSTRACT

The present application relates to communications between a partner network and a wide area network (WAN). The partner network and WAN may exchange representations of the respective networks including a delay profile for the partner network. The WAN receives a network delay profile for multiple virtual network entities within the partner network. The multiple virtual network entities include at least a plurality of peering locations with the WAN. The WAN determines a path from the partner network through the WAN via a selected peering location of the plurality of peering locations with the WAN to a destination based on at least the network delay profile. The WAN deploys a policy (Continued)

for an agent within the partner network. The policy identifies traffic for the destination to route through the WAN via the selected peering location. The WAN routes traffic from the selected peering location to the destination along the path.

29 Claims, 9 Drawing Sheets

(56) References Cited

U.S. PATENT DOCUMENTS

| | | | |
|---|---|---|---|
| 2011/0019676 A1* | 1/2011 | Portolani | H04L 45/74 370/395.53 |
| 2014/0310605 A1* | 10/2014 | Basile | H04L 41/22 715/736 |
| 2015/0195187 A1* | 7/2015 | Savolainen | H04L 45/122 370/401 |
| 2016/0315808 A1 | 10/2016 | Saavedra | |
| 2017/0105113 A1* | 4/2017 | Seenappa | H04W 40/246 |
| 2019/0268973 A1 | 8/2019 | Bull et al. | |
| 2019/0274070 A1 | 9/2019 | Hughes et al. | |
| 2019/0349259 A1 | 11/2019 | Rovner et al. | |
| 2020/0296029 A1 | 9/2020 | Shenoy | |
| 2021/0067464 A1 | 3/2021 | Cidon et al. | |
| 2021/0067468 A1 | 3/2021 | Cidon et al. | |
| 2021/0091973 A1* | 3/2021 | Gwun | H04L 12/4641 |
| 2021/0168027 A1 | 6/2021 | Parulkar et al. | |
| 2021/0267014 A1* | 8/2021 | Kakinada | H04W 72/0493 |
| 2022/0103471 A1 | 3/2022 | Kulkarni et al. | |
| 2022/0191647 A1 | 6/2022 | Zohoorian et al. | |

OTHER PUBLICATIONS

Mimidis, Angelos, "Policy Framework For ONOS", Retrieved from: https://wiki.onosproject.org/display/ONOS/POLICY+ FRAMEWORK+FOR+ONOS#POLICYFRAMEWORKFORONOS-Introduction, Feb. 26, 2019, 9 Pages.

"International Search Report and Written Opinion Issued in PCT Application No. PCT/US22/029723", dated Jul. 22, 2022, 14 Pages.

"International Search Report and Written Opinion Issued in PCT Application No. PCT/US22/030988", dated Aug. 29, 2022, 13 Pages.

* cited by examiner

STITCHING MULTIPLE WIDE AREA NETWORKS TOGETHER

BACKGROUND

Wide area networks may include computing resources spread across a geographic region and connected via communication links such as fiber optic cables. The size of wide area networks may vary greatly from a small city to a global network. For example, a WAN may connect multiple offices of an enterprise, the customers of a regional telecommunications operator, or a global enterprise. The computing resources and connections within a WAN may be owned and controlled by the WAN operator.

A partner network may obtain services from the WAN. For example, a partner network may be an enterprise network and the WAN may host services for users of the enterprise network. For instance, the WAN may be a cloud services provider that provides infrastructure as a service (IaaS) services such as virtual machines (VM), platform as a service (PaaS) services such as databases and serverless computing, and software as a service (SaaS) services such as authentication platforms.

Generally, the partner network and the WAN are loosely coupled in that the partner network requests cloud services with little information about implementation within the WAN. A virtual WAN may provide the partner network with additional information about the WAN and an ability to configure various services. A WAN operator, however, may have little information about the partner network. Accordingly, deployment of WAN computing resources and routing of traffic may include inefficiencies. For example, when the partner network and the WAN are connected at multiple peering locations, routing of traffic between the networks may be based on arbitrary selection of peering locations because both networks lack information about the topology of the other network.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an example, an apparatus for managing connectivity between a partner network and a wide-area network (WAN) is provided. The apparatus includes a memory storing one or more instructions for managing the WAN and at least one processor coupled to the memory and configured to execute the instructions. The at least one processor is configured to receive, from the partner network, a network delay profile for multiple virtual network entities within the partner network. The multiple virtual network entities include at least a plurality of peering locations with the WAN. The at least one processor is configured to determine a path from the partner network through the WAN via a selected peering location of the plurality of peering locations with the WAN to a destination based on at least the network delay profile. The at least one processor is configured to deploy a policy for an agent within the partner network. The policy identifies traffic for the destination to route through the WAN via the selected peering location. The at least one processor is configured to route traffic from the selected peering location to the destination along the path.

In another example, a method of connecting a WAN with a partner network is provided. The method includes receiving, from the partner network, a network delay profile for multiple virtual network entities within the partner network, the multiple virtual network entities including at least a plurality of peering locations with the WAN. The method includes determining a path from the partner network through the WAN via a selected peering location of the plurality of peering locations with the WAN to a destination based on at least the network delay profile. The method includes deploying a policy for an agent within the partner network, the policy identifying traffic for the destination to route through the WAN via the selected peering location. The method includes routing traffic from the selected peering location to the destination along the path.

In another example, a method of connecting a network to a WAN is provided. The method includes sending a network delay profile for multiple virtual network entities within the network to the WAN, the multiple virtual network entities including at least a plurality of peering locations with the WAN. The method includes receiving a policy from the WAN, the policy identifying traffic for a destination to route through the WAN via a selected peering location of the plurality of peering locations with the WAN. The method includes routing traffic for the destination to the selected peering location based on the policy.

In some implementations, the network delay profile includes at least a network metric for each of the plurality of peering locations. The partner network may include a cellular network and the network delay profile may include locations of cellular network nodes and network metrics between the cellular network nodes and the plurality of peering locations. The network metric for each of the plurality of peering locations may include one or more of a latency, a bandwidth, or a cost metric.

In some implementations, the policy indicates to configure one or more routers within the partner network to label traffic within the partner network based on the selected peering location.

In some implementations, the destination is a second selected peering location with the partner network.

In some implementations, to determine the path the at least one processor is configured to select the selected peering location based on the network delay profile and delay values for paths through the WAN from the plurality of peering locations with the WAN to the destination. The at least one processor may be configured to select one or more routers within the WAN based on the delay values for the paths through the WAN. The at least one processor may be configured to select one or more virtual network entities within the partner network based on the network delay profile.

In some implementations, to determine the path the at least one processor is configured to negotiate the path with the partner network.

In some implementations, the at least one processor is configured to provide a representation of the WAN to the partner network, the representation including virtual network entities associated with respective geographic locations and virtual connections between the virtual network entities.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
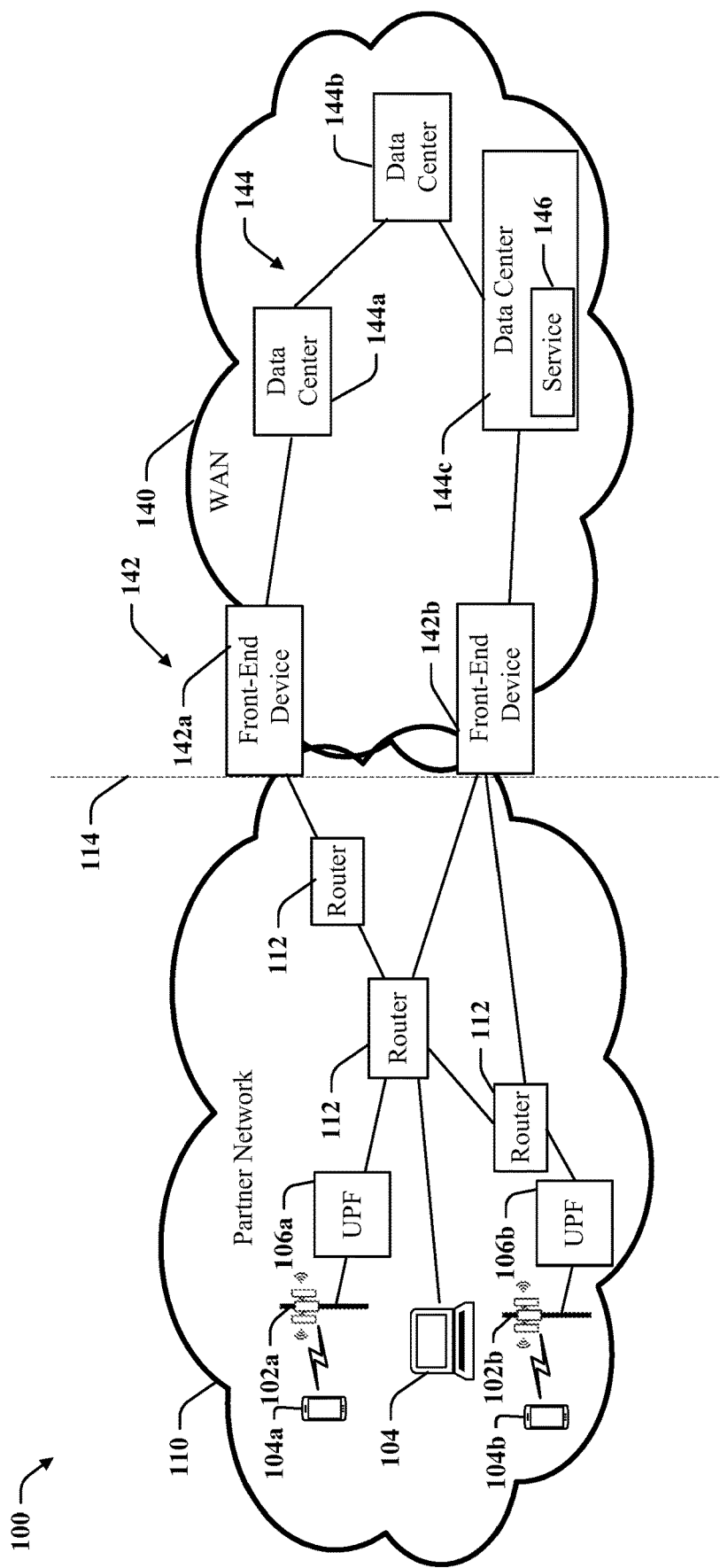
FIG. 1 is a diagram of an example of an architecture for connecting a partner network to a wide area network (WAN), in accordance with aspects described herein.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known components are shown in block diagram form in order to avoid obscuring such concepts.

This disclosure describes various examples related to routing of traffic within a partner network and a wide area network (WAN). The partner network and the WAN may be considered separate administrative domains. That is, the WAN may be controlled by a first entity and the partner network may be controlled by a second entity that is different than the first entity. Conventionally, networks with different administrative domains may be interconnected as an internet. For example, the networks may utilize border gateway protocol (BGP) to advertise routes to various internet protocol (IP) addresses. Routing on such an internet is generally based on availability and cost. That is, packets may be forwarded on the lowest cost route available to reach a destination. Such routing, however, may be unpredictable in terms of performance and quality of service (QoS). Accordingly, there is a need for improved routing between networks under separate administrative domains to improve performance of connections and QoS.

One barrier to improved routing is the proprietary nature of network topologies. Network service providers may have significant investments in network infrastructure and may be unwilling to share network topology information with other network service providers. Accordingly, a system for routing traffic between networks that does not require complete disclosure of a network topology to another network service provider would be desirable.

In an aspect, the disclosure provides techniques for a WAN and a partner network to establish paths for traffic across both networks. The computing resources of the WAN and the partner network may be spread across overlapping geographic areas. In an aspect, the partner network and the WAN are connected at a plurality of peering locations, for example, at points of presence (POPs). A WAN operator may provide a representation of the WAN to the partner network. The representation may include a plurality of virtual network entities that represent resources within a geographical region. The partner network may provide a network delay profile to the WAN operator. The network delay profile may similarly include multiple virtual network entities including at least a plurality of peering locations with the WAN. The network delay profile may include delays between the virtual network entities.

In an aspect, the partner network may provide the network delay profile according to a level of trust with the WAN operator. For example, a minimum delay profile may include only the plurality of peering locations and delays there between. The minimum delay profile may allow the WAN to select a network path through the WAN to a destination. The partner network may provide additional information about the structure or topology of the partner network to improve selection of paths and/or configuration of services. For example, the partner network may add additional virtual network entities within the delay profile. The additional virtual network entities may allow the WAN to select a path that extends across the partner network.

The WAN may provide the partner network with a policy for routing traffic from the partner network to the WAN via a selected peering location on the selected path. For example, the WAN may identify a path for service that can be routed through the WAN for at least some of the virtual network entities. The routing policy may specify that traffic for the service at the identified virtual network entities should be routed to a particular virtual network entity or peering location of the WAN. An agent in the partner network may configure devices within the partner network to route the traffic according to the routing policy. For instance, the agent may configure routing tables at one or more routers within the partner network.

The WAN may also route traffic from the selected peering location to a destination for the service. For instance, the WAN may configure underlying network resources to route traffic along the path. In some implementations, the WAN may route traffic according to negotiated parameters for the path.

Figure 3:
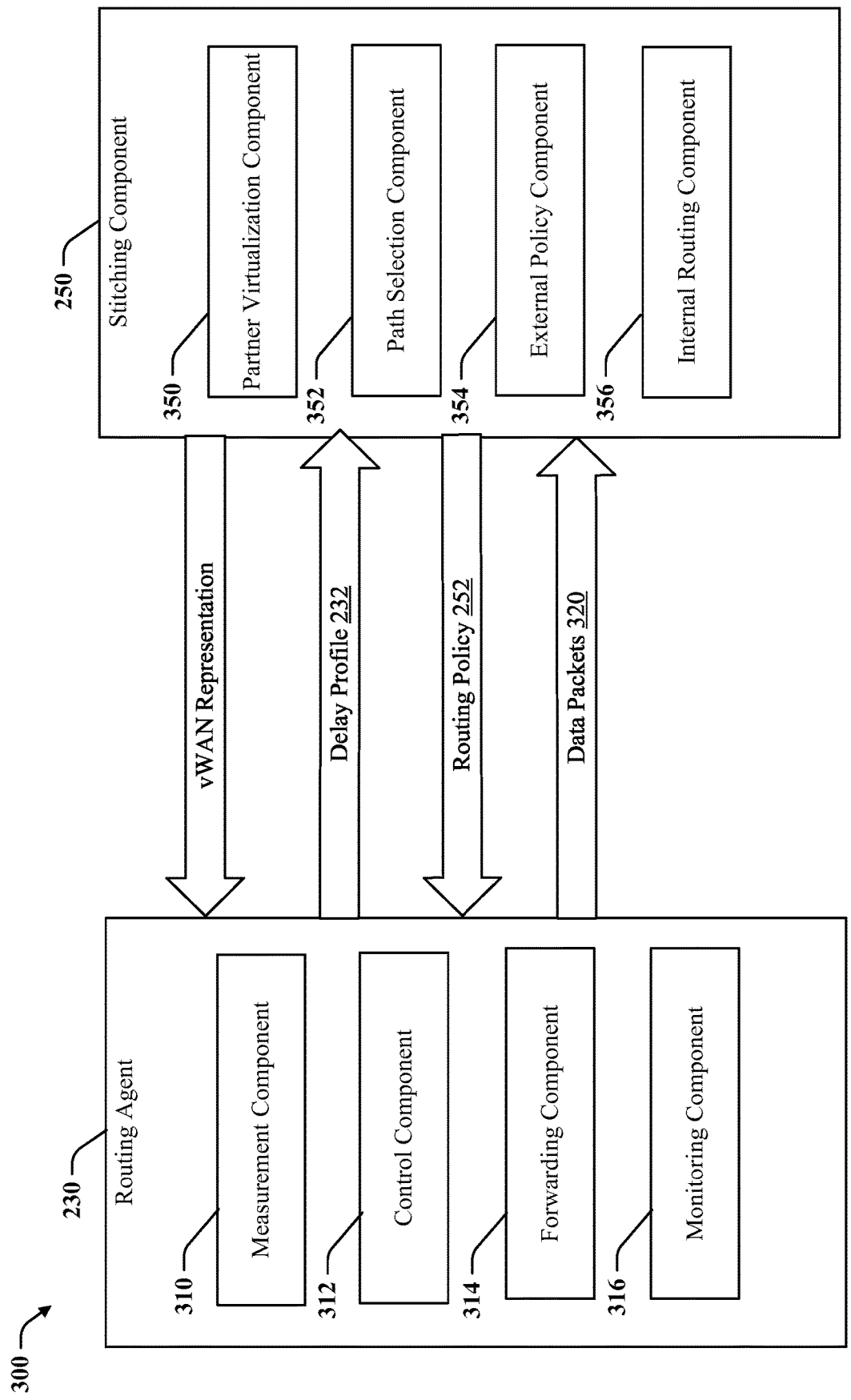
FIG. 3 is a diagram of example components of a routing agent and stitching component and communications there between, in accordance with aspects described herein.
Figure 4:
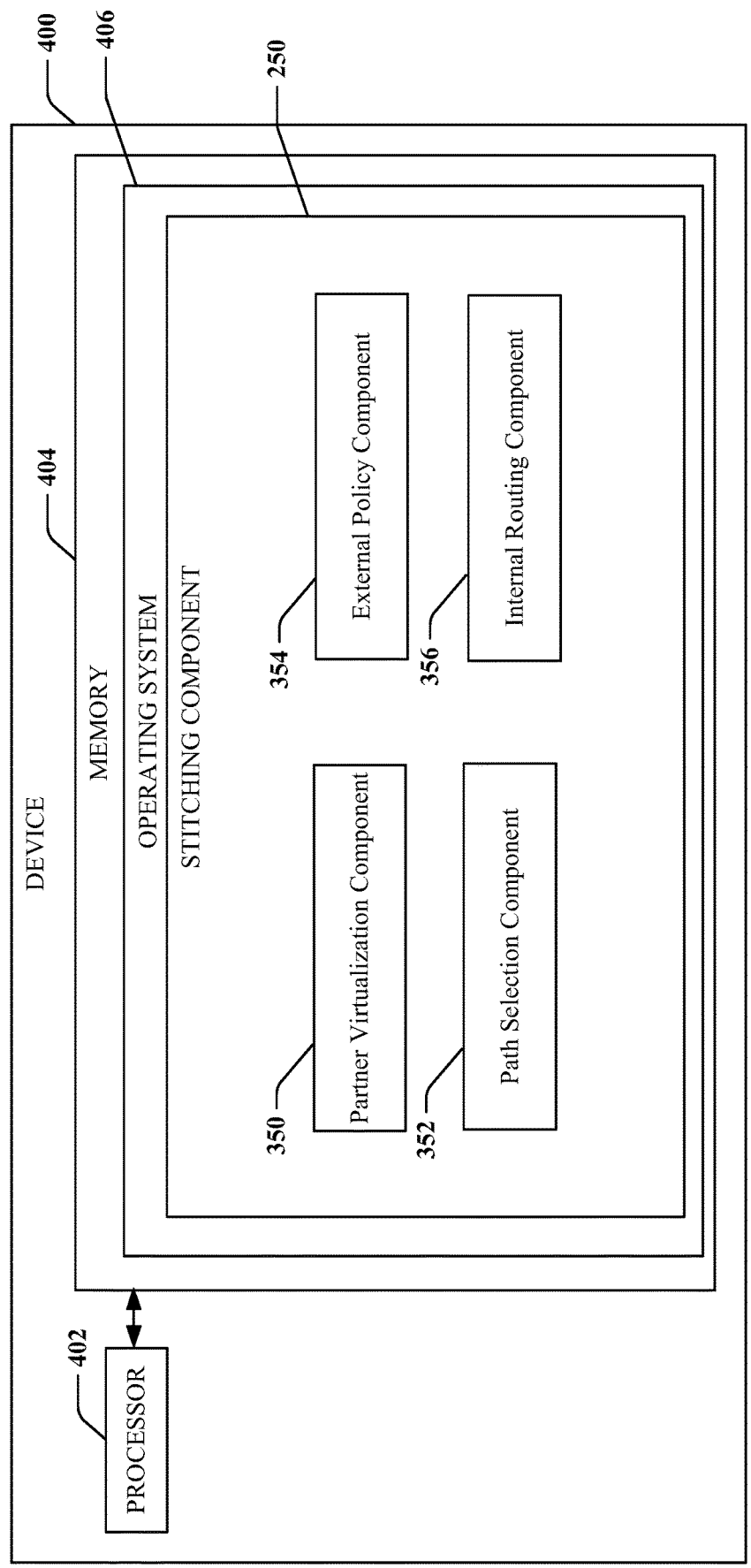
FIG. 4 is a schematic diagram of an example of a device for configuring routing between a partner network and a WAN, in accordance with aspects described herein.
Figure 5:
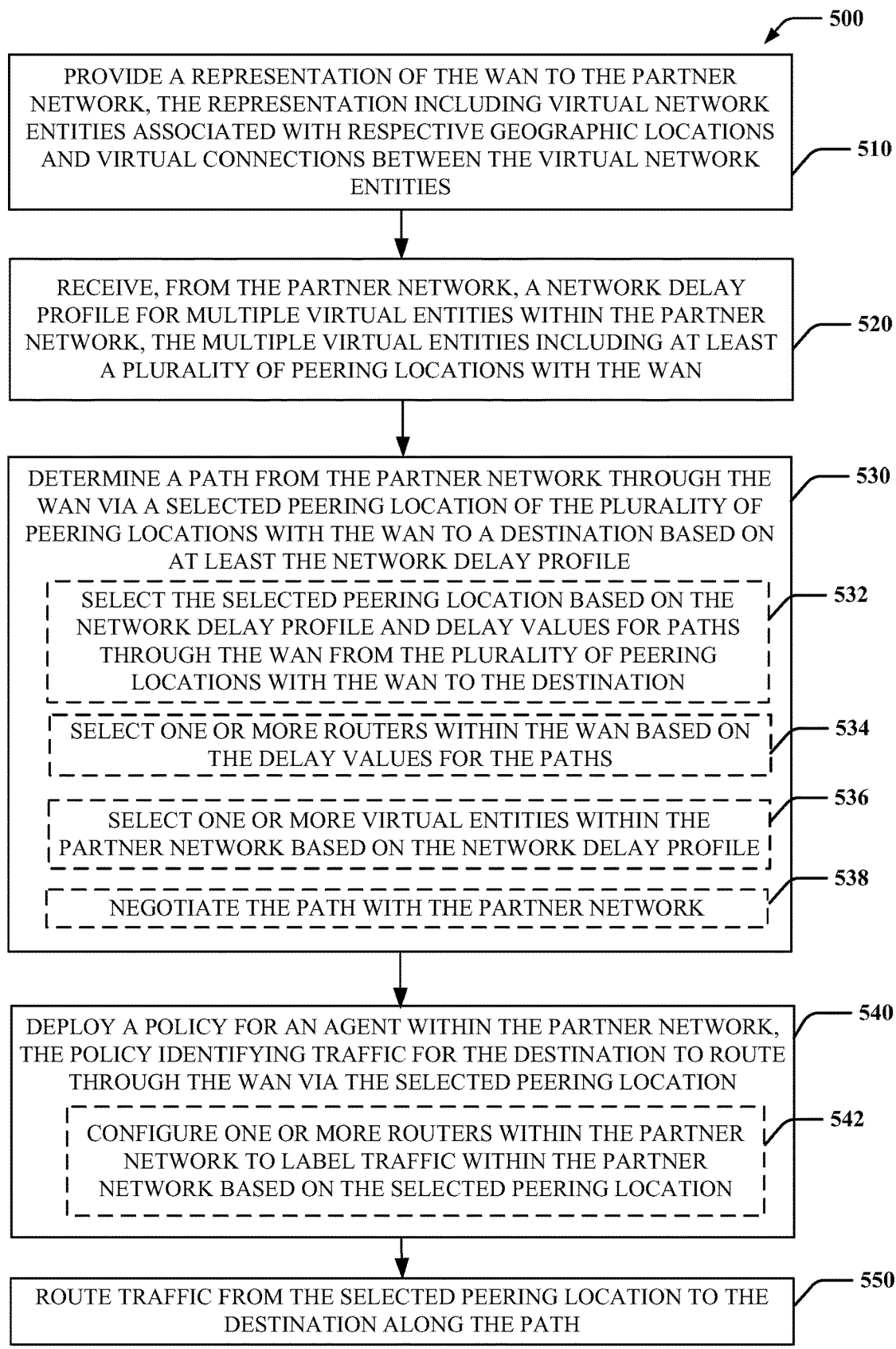
FIG. 5 is a flow diagram of an example of a method of configuring routing between a partner network and a WAN, in accordance with aspects described herein.
Figure 6:
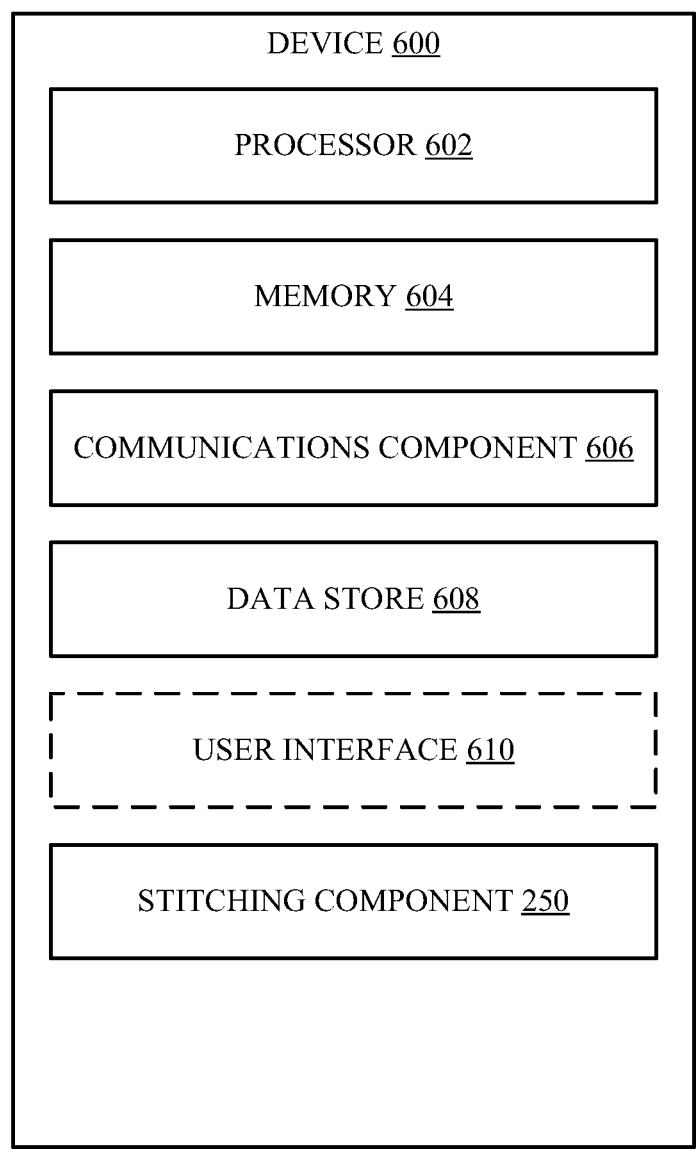
FIG. 6 is a schematic diagram of an example of a device for performing functions of a stitching component described herein, in accordance with aspects described herein.
Figure 7:
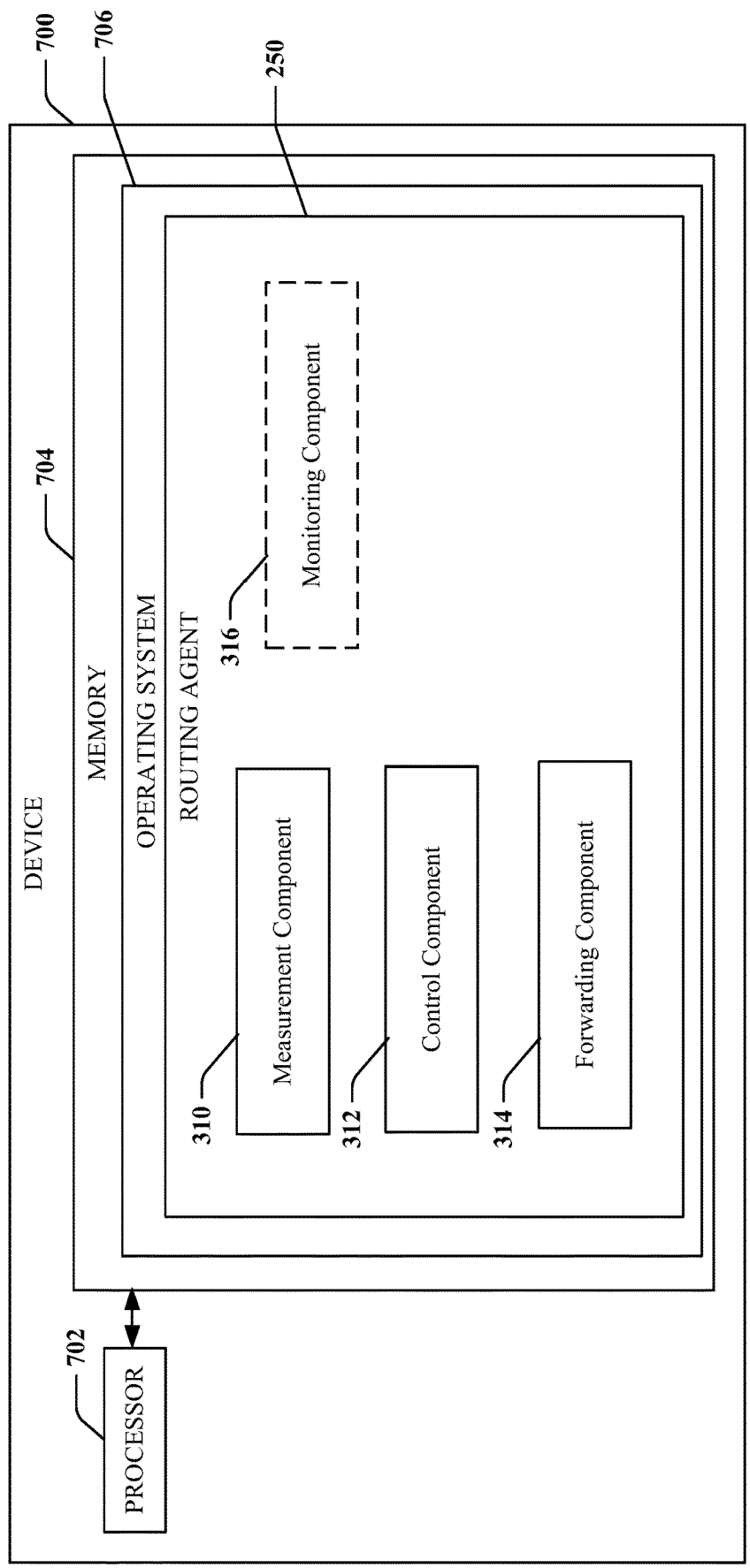
FIG. 7 is a schematic diagram of an example of a device for routing traffic from a partner network to a WAN, in accordance with aspects described herein.
Figure 8:
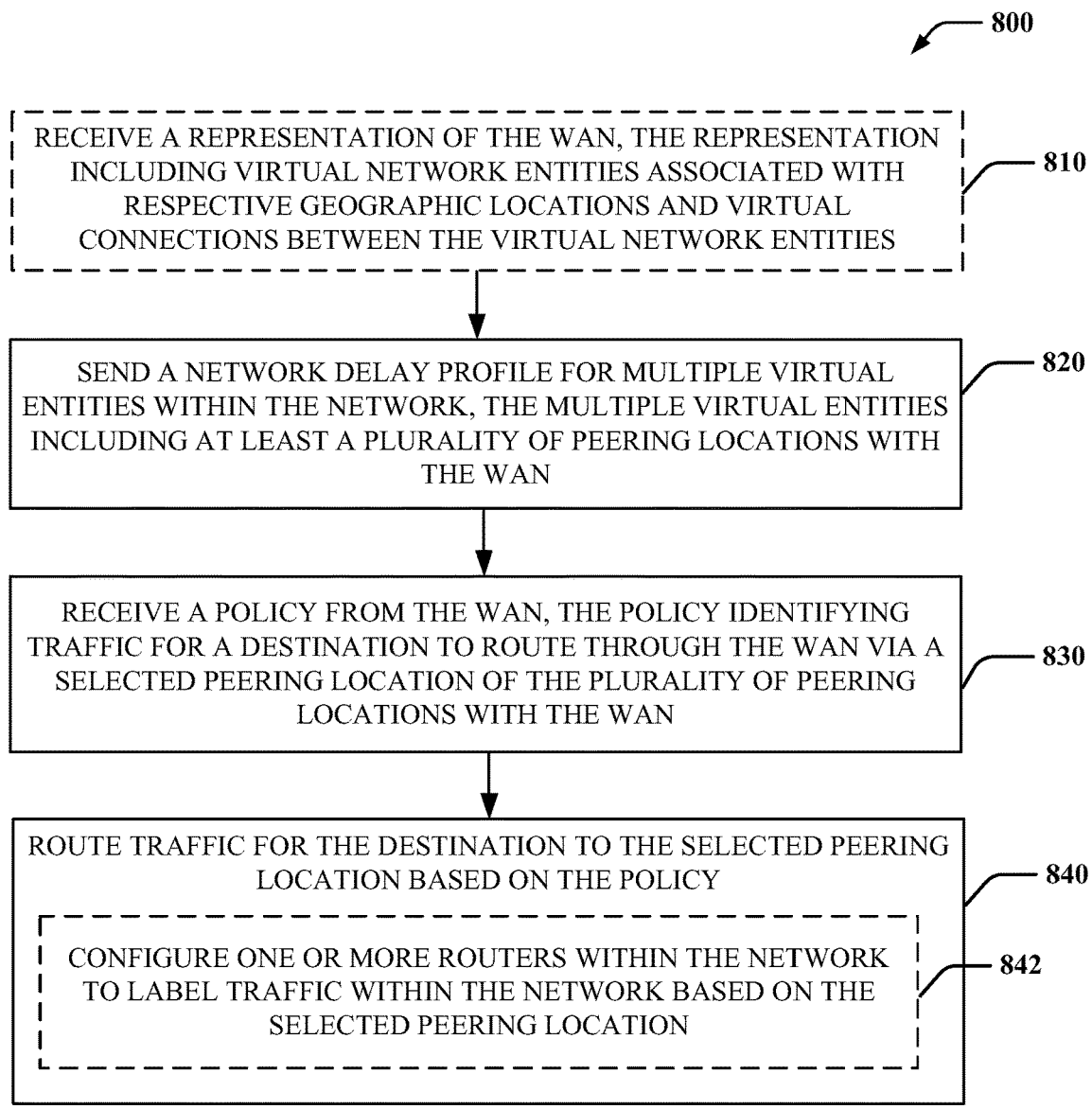
FIG. 8 is a flow diagram of an example of a method of routing traffic from a partner network to a WAN, in accordance with aspects described herein.

Turning now to FIGS. 1-9, examples are depicted with reference to one or more components and one or more methods that may perform the actions or operations described herein, where components and/or actions/operations in dashed line may be optional. Although the operations described below in FIGS. 5 and 8 are presented in a particular order and/or as being performed by an example component, the ordering of the actions and the components performing the actions may be varied, in some examples, depending on the implementation. Moreover, in some examples, one or more of the actions, functions, and/or described components may be performed by a specially-programmed processor, a processor executing specially-programmed software or computer-readable media, or by any other combination of a hardware component and/or a software component capable of performing the described actions or functions.

FIG. 1 is a conceptual diagram 100 of an example of an architecture for connectivity between a partner network 110 and a WAN 140. The WAN 140 may host a service 146 for the partner network 110. For example, the service 146 may be an application hosted on the WAN 140 as a cloud service. As another example, a transport service may be represented as an egress point of the WAN 140, such that the WAN 140 may transport packets toward a destination. For instance, the partner network 110 may utilize the WAN 140 as a backbone to carry traffic between different points of the partner network 110.

The partner network 110 may include any computer network that may connect to the WAN 140. For example, the partner network may include an enterprise network, which may itself be a WAN connecting multiple locations of the enterprise. As another example, the partner network 110 may include a cellular network. A cellular network may include a radio access network (RAN), core network, and a backhaul network. For example, the partner network 110 may include user devices 104 (e.g., user device 104a and 104b) that wirelessly connects to a respective base station 102 (e.g., base station 102a and 102b). The partner network 110 may include cellular network nodes such as a user plane function (UPF) 106 that handles user traffic to and from a core network. Other cellular network nodes may include service gateways (SGWs) and packet gateways (PGWs) that perform similar functions. In some implementations, the service 146 may include a core network function. For instance, the WAN 140 may connect multiple UPFs 106 (e.g., UPF 106a and UPF 106b) for carrying user traffic (e.g., from user device 104a to user device 104b). The partner network 110 may include routers 112 that route traffic within the partner network 110 and to other networks (e.g., the WAN 140). A boundary 114 may separate the administrative domain of the WAN 140 and the administrative domain of the partner network 110.

The WAN 140 may include computing resources spread across a geographic region and connected via communication links such as fiber optic cables. For example, the WAN 140 may include front-end devices 142 and data centers 144. The front-end devices 142 may be referred to as edge devices and may include routers and/or servers, for example. The front-end devices 142 may be located at a point of presence (POP) and have a peering connection with the partner network 110. Accordingly, the partner network 110 may route traffic to a specific front-end device 142 of the WAN 140. Similarly, the WAN 140 may route traffic to the partner network 110 at a peering connection. The data centers 144 may represent computing resources within the WAN 140. For example, the data centers 144 (e.g., data centers 144a, 144b, and 144c) may include servers that host applications such as the service 146. The data centers 144 may include routers that forward traffic to other network resources. Additionally, the routers may include software routers that execute instructions on general purpose computers to make routing decisions.

Conventionally the WAN 140 and the partner network 110 may not share internal network topology information. For example, if the service 146 is hosted on a data center 144c, the partner network 110 may route traffic to either the front-end device 142a or the front-end device 142b to reach the service 146. In some cases, the quality of the connection to the service 146 may vary based on which front-end device 142 is selected. The quality of the connections to the service 146 may theoretically be improved by selecting the better front-end device 142, but the partner network 110 may lack information about the WAN 140 to make such a selection. Similarly, the WAN 140 may lack information about the partner network 110 to support such selection. As another example, the partner network 110 may be able to route traffic internally between a UPF 106a and UPF 106b, but an internal route may be congested or have high latency. The partner network 110 may be able to offload traffic to the WAN 140 to carry the traffic between the UPFs 106, but the partner network 110 may lack information about the WAN 140 to determine whether such offloading would improve quality. Similarly, even if the WAN 140 were to provide a SLA guarantying service between front-end devices 142, the WAN 140 may lack any information or control regarding routing within the partner network 110.

Figure 2:
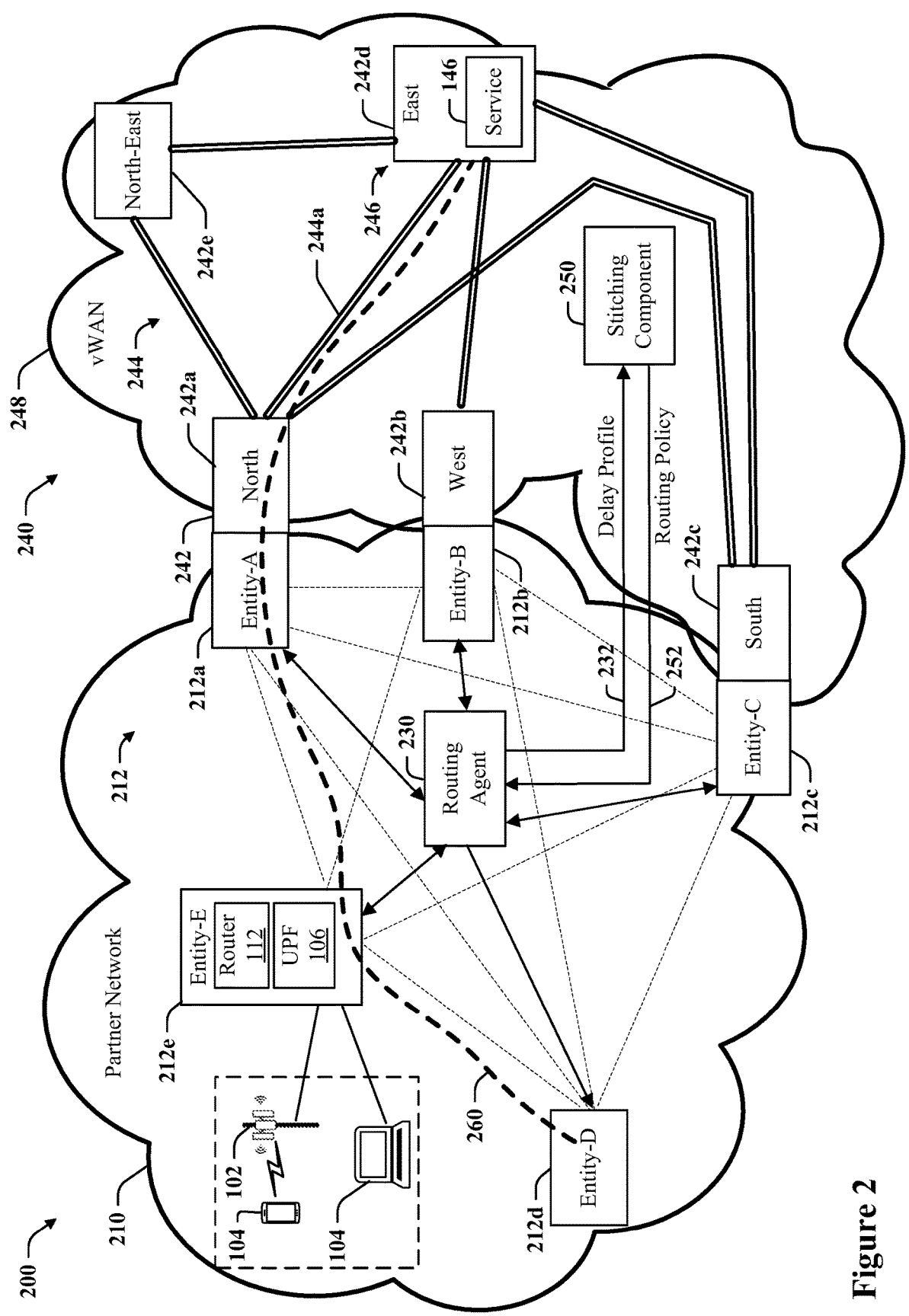
FIG. 2 is a diagram of an example of an architecture for connecting a partner network to a WAN via a selected path, in accordance with aspects described herein.

FIG. 2 is a conceptual diagram 200 of an example of an architecture for stitching together a partner network 210 and a WAN 240 to provide connectivity and control over routing. In an aspect, the partner network 210 may include a routing agent 230 to direct traffic to a selected front-end device of the WAN 240. The WAN 240 includes a stitching component 250 that communicates with the routing agent 230 and provides routing policies to the routing agent 230. In an aspect, both the WAN 240 and the partner network 210 may provide a representation to the other network.

The representation of the WAN 240 may be referred to as a virtual WAN or vWAN 248. The vWAN 248 may include a plurality of virtual network entities 242. Each virtual network entity 242 may be associated with a geographic location and represent physical computing resources controlled by the WAN 240 in the geographic location. The geographic locations may be of different sizes; for example, a geographic location may be a city, a state, a region, or a country. As illustrated, the vWAN 248 may include a north virtual network entity 242a, a west virtual network entity 242b, a south virtual network entity 242c, an east virtual network entity 242d and a north-east virtual network entity 242e. In an aspect, the vWAN 248 may identify a virtual network entity (e.g., east virtual network entity 242d) that hosts a service 146. In some implementations, the partner network 110 may configure a virtual network entity 242 to host a service 146. In various examples described herein, traffic may be routed to a destination 246. For example, the service 146 and/or the virtual network entity 242d hosting the service 146 may be referred to as the destination 246. In some examples, the WAN 240 may provide a transport service for the partner network in which traffic ingresses the WAN 240 as a first peering location and the destination 246 is a second peering location where traffic egresses the WAN 240 into the administrative domain of the partner network 210. The vWAN may include virtual connections 244 between the virtual network entities 242. The virtual connections 244 may represent communication links and routing resources between the computing resources represented by the virtual network entities. In some implementations, the partner network 110 may configure the virtual connections 244. For instance, the partner network 110 may set performance requirements and/or policies for a virtual connection 244 between two virtual network entities.

The partner network 210 may be similar to the partner network 110 and include user devices 104. In the case of a RAN, the partner network 210 may include the base stations 102 and UPFs 106. In an aspect, the partner network 210 may be represented by a delay profile that abstracts or hides individual network resources such as user devices 104, base stations 102, and UPFs 106. Instead, the delay profile may include virtual network entities 212. The virtual network entities 212 may be selected by an operator of the partner network 210. For example, the virtual network entities 212 may be associated with geographic locations like the virtual network entities 242. However, the network operator may choose different strategies, for example, based on a level of trust with the WAN 240. For instance, the partner network 210 may identify certain network devices (e.g., UPFs 106) as virtual network entities 242 if there is a high level of trust or arbitrarily group network devices into virtual network entities 242 if there is a low level of trust. In an aspect, the delay profile 232 for the partner network 210 includes at least a plurality of virtual network entities that are peering locations with the WAN 240. The peering locations may have a direct connection with a device of the WAN 240. For example, virtual network entities 212a, 212b, and 212c may be peering locations with the north virtual network entity 242a, west virtual network entity 242b, and south virtual network entity 242c, respectively.

The routing agent 230 may provide a delay profile 232 to the stitching component 250. The delay profile 232 may include at least a network metric for each virtual network entity. For instance, in a minimal example, the network metric may be an average latency for traffic to reach the network entity, which may be the peering locations. If the partner network 210 chooses to provide more information, the delay profile 232 may include a network metric (e.g., latency) between each of the virtual network entities 212. For instance, the delay profile 232 may be a matrix including a network metrics in each direction for each pair of virtual network entities. In some implementations, the network metric may be a latency, a bandwidth, or a cost metric.

The stitching component 250 may determine a path 260 from the partner network 210 through the WAN 240 via a selected peering location (e.g., virtual network entity 212a) of the plurality of peering locations with the WAN to a destination based on at least the network delay profile 232. For example, the stitching component 250 may select a virtual network entity 242 (e.g., virtual network entity 242a) to receive traffic for the service 146 based on delay metrics associated with the peered virtual network entities 212 of the partner network 210. For instance, the stitching component 250 may select the virtual network entity 242 associated with the least delay in the partner network 210. The stitching component 250 may select the virtual network entity 242 based on delay values for the WAN 240. For example, the stitching component 250 may select a path with a shortest total delay value from a source in the partner network 210 to a destination (e.g., service 146) in the WAN 240. The virtual network entity 242 on the path 260 may be the selected virtual network entity.

In an aspect, the stitching component 250 may select a portion of the path 260 from the selected virtual network entity 242a to the destination 246 (e.g., virtual network entity 242d hosting service 146). For example, the path 260 may include one or more virtual connections 244 (e.g., virtual connection 244a) as the path from the partner network through the WAN. In another aspect, the stitching component 250 may select physical routing devices within the WAN 240 based on delay values for the paths. In an aspect, the stitching component 250 may dynamically configure the path within the WAN 240. For example, traffic may be rerouted based on congestion for a selected path.

In an aspect, the stitching component 250 may select one or more virtual network entities 212 within the partner network based on the network delay profile. For example, when the source (e.g., virtual network entity 212d) is not a virtual network entity 212 associated with a peering location, the stitching component 250 may select one or more peering virtual network entities 212 (e.g., virtual network entity 212a) or intermediate virtual network entities (e.g., virtual network entity 212e) on the path 260 within the partner network 210. For instance, the stitching component 250 may select virtual network entities 212 along a lowest delay path from the source to the selected virtual network entity 242.

In an aspect, the stitching component 250 may negotiate the path with the partner network 210. For example, the partner network 210 may be a customer of the WAN 240 and pay for routing traffic to the destination. The stitching component 250 may propose multiple potential paths having different characteristics (e.g., delay) and a cost associated with each potential path. The partner network 210 and/or routing agent 230 may select a proposed potential path, for example, based on a rule (e.g., lowest cost, lowest delay, best cost to delay ratio, etc.). In an aspect, the WAN 240 and/or stitching component 250 may agree to a SLA to route traffic according to the negotiated path. In some implementations, the negotiated path and SLA may be represented in the vWAN as a virtual connection 244.

The stitching component 250 may provide a routing policy 252 to the routing agent 230. The routing policy 252 may identify traffic for the destination to route through the WAN 240 via the selected peering location (e.g., virtual network entity 212a). For example, the routing policy 252 may identify a 5-tuple (source IP address, source port, destination IP address, destination port, and protocol) for traffic to route through the WAN 240 via the virtual network entity 212a. In some implementations, the routing policy 252 may identify additional virtual network entities 212 along the selected path. The routing agent 230 may be responsible for configuring the partner network 210 to route traffic according to the routing policy 252. For example, the routing agent 230 may configure one or more routing devices to identify traffic according to the 5-tuple and route the traffic to a front-end device at the peering location associated with the selected virtual network entity 242. Where the routing policy 252 identifies one or more virtual network entities 212 along the selected path, the routing agent 230 may configure routing devices (e.g., routers 112) associated with each virtual network entity 212 to route the identified traffic to a device associated with a next virtual network entity 212 along the selected path. In some implementations, the routing agent 230 may configure one or more routing devices to label traffic within the partner network 210 based on the selected peering location.

The stitching component 250 may route traffic from the selected peering location to the destination along the path 260. In an aspect, the stitching component 250 may maintain control of routing decisions within the WAN 240 subject to meeting any agreed SLAs for the traffic. For instance, if the selected path includes the virtual network entity 242a and the virtual network entity 242d, the path may be associated with a virtual connection 244a. The stitching component 250 may implement the virtual connection 244a using any available network resources consistent with the SLA and any policies for the virtual connection 244a. For instance, if there is no direct connection between physical network resources associated with the virtual network entity 242a and physical network resources associated with the virtual network entity 242d, the stitching component 250 may utilize physical network resources associated with virtual network entity 242c or 242e. Similarly, the stitching component 250 may make routing decisions and utilize physical network resources based on a current state of the WAN 240 including a load on the physical network resources.

FIG. 3 is a diagram 300 of example components of the routing agent 230 and the stitching component 250 and communications there between. The routing agent 230 may include a measurement component 310, a control component 312, a forwarding component 314, and a monitoring component 316. The stitching component 250 may include a partner virtualization component 350, a path selection component 352, an external policy component 354 and an internal routing component 356.

The measurement component 310 may be configured to measure delay metrics within the partner network 210. For example, the measurement component 310 may determine a delay metric between virtual network entities 212. Because the virtual network entities 212 may be an abstraction of underlying physical network devices, the measurement component 310 may select a representative device or determine an average of metrics for devices associated with a virtual network entity 242. For instance, in a RAN, a virtual network entity 212 may represent one or more UPFs 106 as well as associated base station 102 and user devices 104. The measurement component 310 may select a single UPF 106 as representative and measure delays from the UPF 106 to other selected representative devices. As another example, a representative device may be a routing device that routes traffic to other parts of the partner network 210. The measurement component 310 may be configured by an operator of the partner network 210 to provide the delay profile 232 based on a level of trust with the WAN 240.

The control component 312 may be configured to communicate with the stitching component 250. For example, the control component 312 may establish a session with the stitching component 250. The control component 312 may provide the network delay profile 232 to the stitching component 250 via the session. The control component 312 may receive the routing policy 252 from the stitching component 250 via the session.

The forwarding component 314 may be configured to route traffic for the destination to the selected peering location based on the policy. For example, the forwarding component 314 may configure routing devices within the partner network 210. For instance, the forwarding component 314 may provision rules for identifying and/or labelling traffic for a destination in the WAN based on the routing policy 252. In some examples, the forwarding component 314 may configure routing tables of routing devices within the partner network 210. In an aspect, the forwarding component may determine an address of a selected peering location identified in a routing policy 252 and configure the routing devices to forward traffic toward the determined address.

The monitoring component 316 may monitor operation of the routing agent 230. For example, the monitoring component may collect statistics regarding traffic forwarded according to the routing policies. In some implementations, the monitoring component 316 may generate an operator dashboard that is viewable by an operator of the partner network 210. For example, the monitoring component 316 may include a user interface that allows a network operator to view the statistics. In some implementations, the network operator may configure the routing agent 230. For instance, the monitoring component 316 may allow the network operator to define virtual network entities 212, set negotiation rules, or identify services 146 to be associated with a path.

The partner virtualization component 350 may be configured to receive the network delay profile 232 for multiple virtual network entities 212 within the partner network 210. The partner virtualization component 350 may generate a representation of the partner network 210 based on the network delay profile 232. For example, the partner virtualization component 350 may identify the peering locations between the partner network 210 and the WAN 240. The partner virtualization component 350 may determine potential paths within the partner network 210 based on the delay profile.

The path selection component 352 may be configured to determine a path 260 from the partner network 210 through the WAN 240 via a selected peering location (e.g., virtual network entity 242a) of the plurality of peering locations with the WAN to a destination (e.g., service 146) based on at least the network delay profile 232.

The external policy component 354 may be configured to export a routing policy 252 to the routing agent 230 within the partner network 210. The routing policy 252 may identify traffic for the destination to route through the WAN via the selected peering location. For example, the routing policy 252 may identify traffic based on a 5-tuple for a service 146 or destination 246. The routing policy 252 may identify the selected peering location as a virtual network entity 212 (e.g., as identified in the delay profile 232).

The internal routing component 356 may be configured to control one or more routing devices of the WAN 240 to route traffic from the selected peering location to the destination along the path 260. For instance, the internal routing component 356 may configure any packet processing (e.g., decapsulation or header rewriting) to be performed on the arriving data packets. The internal routing component 356 may configure routing tables at a front-end device 142 corresponding to a virtual network entity 242 on the path 260 and each other device on the selected path to forward the data packets toward the service 146 along the selected path.

FIG. 4 is a schematic diagram of an example of a device 400 (e.g., a computing device) for communication between a partner network and a destination in a WAN connected to the partner network. The device 400 may be implemented as one or more computing devices in the WAN 240.

In an example, device 400 can include a processor 402 and/or memory 404 configured to execute or store instructions or other parameters related to providing an operating system 406, which can execute one or more applications or processes, such as, but not limited to, the stitching component 250 for configuring a path between the partner network 210 and the WAN 240. For example, processor 402 and memory 404 may be separate components communicatively coupled by a bus (e.g., on a motherboard or other portion of a computing device, on an integrated circuit, such as a system on a chip (SoC), etc.), components integrated within one another (e.g., processor 402 can include the memory 404 as an on-board component), and/or the like. Memory 404 may store instructions, parameters, data structures, etc. for use/execution by processor 402 to perform functions described herein.

In an example, the stitching component 250 may include the partner virtualization component 350, the path selection component 352, the external policy component 354, and the internal routing component 356.

FIG. 5 is a flow diagram of an example of a method 500 for configuring a path between the partner network 210 and a WAN 240. For example, the method 500 can be performed by a device 400 and/or one or more components thereof to select a between the partner network 210 and the WAN 240 based on a received delay profile of the partner network 210.

At block 510, the method 500 may optionally include providing a representation of the WAN to the partner network, the representation including virtual network entities associated with respective geographic locations and virtual connections between the virtual network entities. In an example, the stitching component 250, e.g., in conjunction with processor 402, memory 404, and operating system 406, can provide a representation (e.g., vWAN 248) of the WAN 240 to the partner network 210, the representation including virtual network entities 242 associated with respective geographic locations and virtual connections 244 between the virtual network entities 242.

At block 520, the method 500 includes receiving, from the partner network, a network delay profile for multiple virtual network entities within the partner network, the multiple virtual network entities including at least a plurality of peering locations with the WAN. In an example, the stitching component 250 and/or the partner virtualization component 350, e.g., in conjunction with processor 402, memory 404, and operating system 406, can receive, from the partner network 210, a network delay profile 232 for multiple virtual network entities 212 within the partner network 210, the multiple virtual network entities 212 including at least a plurality of peering locations (e.g., virtual network entities 212a, 212b, 212c) with the WAN 240. For example, in some implementations, the network delay profile 232 includes at least a network metric for each of the plurality of peering locations (e.g., virtual network entities 212a, 212b, 212c). As another example, in some implementations, where the partner network 210 includes radio network nodes such as user plane function (UPF) nodes, the network delay profile 232 includes locations of UPF nodes, and delay values between the UPF nodes and the plurality of peering locations. For instance, the network delay profile 232 may include a matrix of delay values between each pair of virtual network entities. The network metrics may include one or more of a latency, a bandwidth, or a cost metric.

At block 530, the method 500 includes determining a path from the partner network through the WAN via a selected peering location of the plurality of peering locations with the WAN to a destination based on at least the network delay profile. In an example, the path selection component 352 and/or the stitching component 250, e.g., in conjunction with processor 402, memory 404, and operating system 406, can determine the path (e.g., path 260) from the partner network through the WAN 240 via a selected peering location (e.g., virtual network entity 212a) of the plurality of peering locations with the WAN 240 to a destination (e.g., service 146 hosted on virtual network entity 242d) based on at least the network delay profile 232. In some implementations, at sub-block 532, the block 530 includes selecting the selected peering location (e.g., virtual network entity 212a) based on the network delay profile 232 and delay values for paths through the WAN 240 from the plurality of peering locations with the WAN to the destination 246. In some implementations, at sub-block 534, the block 530 includes selecting one or more routers within the WAN 240 based on the delay values for the paths through the WAN. In some implementations, at sub-block 536, the block 530 includes selecting one or more virtual network entities 212 within the partner network 210 based on the network delay profile 232. In some implementations, at sub-block 538, the block 530 includes negotiating the path 260 with the partner network 210.

At block 540, the method 500 includes deploying a policy for an agent within the partner network, the policy identifying traffic for the destination to route through the WAN via the selected peering location. In an example, the external policy component 354 and/or the stitching component 250, e.g., in conjunction with processor 402, memory 404, and operating system 406, can deploy a policy 252 for an agent 230 within the partner network 210, the policy 252 identifying traffic for the destination 246 to route through the WAN 240 via the selected peering location (e.g., virtual network entity 212a). In some implementations, at sub-block 542, the block 540 includes configuring one or more routers within the partner network 210 to label traffic within the partner network based on the selected peering location (e.g., virtual network entity 212a).

At block 550, the method 500 includes routing traffic from the selected peering location to the destination along the path. In an example, the internal routing component 356 and/or the stitching component 250, e.g., in conjunction with processor 402, memory 404, and operating system 406, can route traffic 320 from the selected peering location (e.g., virtual network entity 242a peered with virtual network entity 212 a) to the destination 246 along the path 260.

FIG. 6 illustrates an example of a device 600 including additional optional component details as those shown in FIG. 4. In one aspect, device 600 may include processor 602, which may be similar to processor 402 for carrying out processing functions associated with one or more of components and functions described herein. Processor 602 can include a single or multiple set of processors or multi-core processors. Moreover, processor 602 can be implemented as an integrated processing system and/or a distributed processing system.

Device 600 may further include memory 604, which may be similar to memory 404 such as for storing local versions of operating systems (or components thereof) and/or applications being executed by processor 602, such as the routing agent 230, the measurement component 310, the control component 312, the forwarding component 314, the monitoring component 316, etc. Memory 604 can include a type of memory usable by a computer, such as random access memory (RAM), read only memory (ROM), tapes, magnetic discs, optical discs, volatile memory, non-volatile memory, and any combination thereof.

Further, device 600 may include a communications component 606 that provides for establishing and maintaining communications with one or more other devices, parties, entities, etc. utilizing hardware, software, and services as described herein. Communications component 606 may carry communications between components on device 600, as well as between device 600 and external devices, such as devices located across a communications network and/or devices serially or locally connected to device 600. For example, communications component 606 may include one or more buses, and may further include transmit chain components and receive chain components associated with a wireless or wired transmitter and receiver, respectively, operable for interfacing with external devices.

Additionally, device 600 may include a data store 608, which can be any suitable combination of hardware and/or software, that provides for mass storage of information, databases, and programs employed in connection with aspects described herein. For example, data store 608 may be or may include a data repository for operating systems (or components thereof), applications, related parameters, etc. not currently being executed by processor 602. In addition, data store 608 may be a data repository for the routing agent 230.

Device 600 may optionally include a user interface component 610 operable to receive inputs from a user of device 600 and further operable to generate outputs for presentation to the user. User interface component 610 may include one or more input devices, including but not limited to a keyboard, a number pad, a mouse, a touch-sensitive display, a navigation key, a function key, a microphone, a voice recognition component, a gesture recognition component, a depth sensor, a gaze tracking sensor, a switch/button, any other mechanism capable of receiving an input from a user, or any combination thereof. Further, user interface component 610 may include one or more output devices, including but not limited to a display, a speaker, a haptic feedback mechanism, a printer, any other mechanism capable of presenting an output to a user, or any combination thereof.

Device 600 may additionally include a stitching component 250 for communication between the WAN 240 and the partner network 210, partner virtualization component 350 for receiving the network delay profile 232, path selection component 352 for determining a path from the partner network through the WAN, external policy component 354 for deploying a policy 252 for an agent within the partner network, and internal routing component 356 for routing traffic from the selected peering location to the destination 246 along the path 260, etc.

FIG. 7 is a schematic diagram of an example of a device 700 (e.g., a computing device) for managing connectivity between a partner network and a WAN. The device 700 may be implemented as one or more computing devices in the partner network 210. For example, the device 700 may be implemented as a network orchestration server.

In an example, device 700 can include a processor 702 and/or memory 704 configured to execute or store instructions or other parameters related to providing an operating system 706, which can execute one or more applications or processes, such as, but not limited to, the routing agent 230 for configuring routing between the partner network 210 and the WAN 240. For example, processor 702 and memory 704 may be separate components communicatively coupled by a bus (e.g., on a motherboard or other portion of a computing device, on an integrated circuit, such as a system on a chip (SoC), etc.), components integrated within one another (e.g., processor 702 can include the memory 704 as an on-board component), and/or the like. Memory 704 may store instructions, parameters, data structures, etc. for use/execution by processor 702 to perform functions described herein.

In an example, the routing agent 230 may include the measurement component 310, the control component 312, and the forwarding component 314. In some implementations, the routing agent 230 may include a monitoring component 316.

FIG. 8 is a flow diagram of an example of a method 800 for managing connectivity between a partner network and a WAN. For example, the method 800 can be performed by a device 700 and/or one or more components thereof to provide a delay profile to the WAN 240 and route traffic according to a routing policy 252 received from the WAN.

At block 810, the method 800 may optionally include receiving a representation of the WAN, the representation including virtual network entities associated with respective geographic locations and virtual connections between the virtual network entities. In an example, the routing agent 230, e.g., in conjunction with processor 702, memory 704, and operating system 706, receive a representation of the WAN (e.g., vWAN 248), the representation including virtual network entities 242 associated with respective geographic locations and virtual connections 244 between the virtual network entities.

At block 820, the method 800 includes send a network delay profile for multiple virtual network entities within the network, the multiple virtual network entities including at least a plurality of peering locations with the WAN. In an example, the measurement component 310 and/or the routing agent 230, e.g., in conjunction with processor 702, memory 704, and operating system 706, can send a network delay profile 232 for multiple virtual network entities 212 within the network 210, the multiple virtual network entities 212 including at least a plurality of peering locations (e.g., virtual network entities 212a, 212b, and 212c) with the WAN 240.

At block 830, the method 800 includes receiving a policy from the WAN, the policy identifying traffic for a destination to route through the WAN via a selected peering location of the plurality of peering locations with the WAN. In an example, the control component 312 and/or the routing agent 230, e.g., in conjunction with processor 702, memory 704, and operating system 706, can receive a policy 252 from the WAN 240, the policy 252 identifying traffic for a destination 246 to route through the WAN 240 via a selected peering location (e.g., virtual network entity 212a) of the plurality of peering locations with the WAN 240.

At block 840, the method 800 includes routing traffic for the destination to the selected peering location based on the policy. In an example, the forwarding component 314 and/or the routing agent 230 e.g., in conjunction with processor 702, memory 704, and operating system 706, can configure network devices such as UPFs 106 and routers 112 to route traffic for the destination 246 to the selected peering location (e.g., virtual network entity 212a) based on the policy 252. In some implementations, at sub-block 842, the block 840 may include configuring one or more routers 112 within the network 210 to label traffic within the network 210 based on the selected peering location (e.g., virtual network entity 212a).

Figure 9:
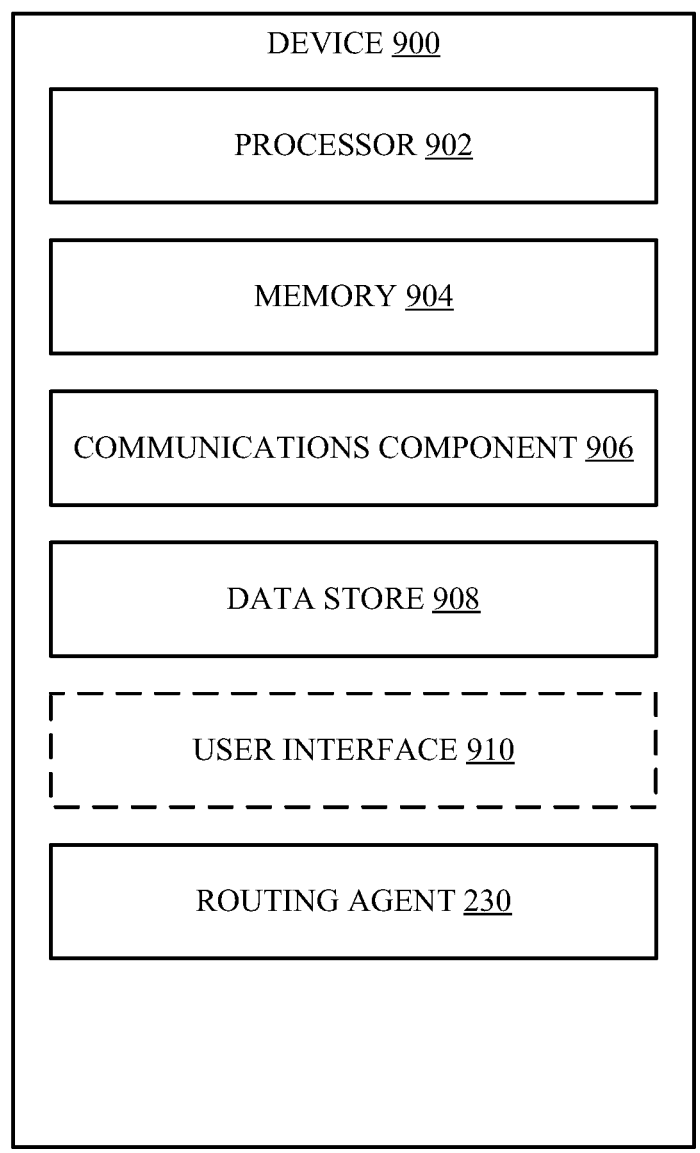
FIG. 9 is a schematic diagram of an example of a device for performing functions of a routing agent described herein, in accordance with aspects described herein.

FIG. 9 illustrates an example of a device 900 including additional optional component details as those shown in FIG. 7. In one aspect, device 900 may include processor 902, which may be similar to processor 702 for carrying out processing functions associated with one or more of components and functions described herein. Processor 902 can include a single or multiple set of processors or multi-core processors. Moreover, processor 902 can be implemented as an integrated processing system and/or a distributed processing system.

Device 900 may further include memory 904, which may be similar to memory 704 such as for storing local versions of operating systems (or components thereof) and/or applications being executed by processor 902, such as the stitching component 250, the partner virtualization component 350, the path selection component 352, the external policy component 354, and the internal routing component 356, etc. Memory 904 can include a type of memory usable by a computer, such as random access memory (RAM), read only memory (ROM), tapes, magnetic discs, optical discs, volatile memory, non-volatile memory, and any combination thereof.

Further, device 900 may include a communications component 906 that provides for establishing and maintaining communications with one or more other devices, parties, entities, etc. utilizing hardware, software, and services as described herein. Communications component 906 may carry communications between components on device 900, as well as between device 900 and external devices, such as devices located across a communications network and/or devices serially or locally connected to device 900. For example, communications component 906 may include one or more buses, and may further include transmit chain components and receive chain components associated with a wireless or wired transmitter and receiver, respectively, operable for interfacing with external devices.

Additionally, device 900 may include a data store 908, which can be any suitable combination of hardware and/or software, that provides for mass storage of information, databases, and programs employed in connection with aspects described herein. For example, data store 908 may be or may include a data repository for operating systems (or components thereof), applications, related parameters, etc. not currently being executed by processor 902. In addition, data store 908 may be a data repository for the routing agent 230.

Device 900 may optionally include a user interface component 910 operable to receive inputs from a user of device 900 and further operable to generate outputs for presentation to the user. User interface component 910 may include one or more input devices, including but not limited to a keyboard, a number pad, a mouse, a touch-sensitive display, a navigation key, a function key, a microphone, a voice recognition component, a gesture recognition component, a depth sensor, a gaze tracking sensor, a switch/button, any other mechanism capable of receiving an input from a user, or any combination thereof. Further, user interface component 910 may include one or more output devices, including but not limited to a display, a speaker, a haptic feedback mechanism, a printer, any other mechanism capable of presenting an output to a user, or any combination thereof.

Device 900 may additionally include a routing agent 230 for managing routing between a partner network and a WAN, an measurement component 310 for sending a network delay profile for multiple virtual network entities within the network to the WAN, a control component 312 for receiving a policy from the WAN, a forwarding component for routing traffic for the destination to the selected peering location based on the policy, etc.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more aspects, one or more of the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described herein that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. An apparatus within a wide-area network (WAN) for managing connectivity between a partner network and the WAN, the WAN and the partner network being in separate administrative domains, comprising:
 a memory storing one or more instructions for managing the WAN; and
 at least one processor coupled to the memory and configured to execute the instructions, wherein the at least one processor is configured to:
  receive, from the partner network at the apparatus within the WAN, a network delay profile for multiple virtual network entities within the partner network, the multiple virtual network entities including virtual network entities corresponding to at least a plurality of peering locations with the WAN, the network delay profile including at least a network metric for each of the multiple virtual network entities within the partner network;
  determine a path from the partner network through the WAN via a selected peering location of the plurality of peering locations with the WAN to a destination within the WAN based on at least the network delay profile;
  deploy a policy for an agent within the partner network, the policy identifying traffic for the destination to route through the WAN via the selected peering location; and
  route traffic from the selected peering location to the destination along the path.

2. The apparatus of claim 1, wherein the network delay profile includes, for one or more respective virtual network entities, at least a network metric between the respective virtual network entity and each of the virtual network entities corresponding to the plurality of peering locations.

3. The apparatus of claim 1, wherein the partner network includes a cellular network and wherein the network delay profile includes virtual network entities corresponding to locations of cellular network nodes and network metrics between the virtual network entities corresponding to the cellular network nodes and each of the virtual network entities corresponding to the plurality of peering locations.

4. The apparatus of claim 1, wherein the network metric for each of the virtual network entities corresponding to the plurality of peering locations includes one or more of a latency, a bandwidth, or a cost metric.

5. The apparatus of claim 1, wherein policy indicates to configure one or more routers within the partner network to label traffic within the partner network based on the selected peering location.

6. The apparatus of claim 1, wherein the destination is a virtual network entity within the WAN corresponding to a second selected peering location with the partner network.

7. The apparatus of claim 1, wherein to determine the path the at least one processor is configured to select the selected peering location based on the network delay profile and delay values for paths through the WAN from the plurality of peering locations with the WAN to the destination.

8. The apparatus of claim 7, wherein to determine the path the at least one processor is configured to select one or more routers within the WAN based on the delay values for the paths through the WAN.

9. The apparatus of claim 7, wherein to determine the path the at least one processor is configured to select one or more virtual network entities within the partner network based on the network delay profile.

10. The apparatus of claim 1, wherein to determine the path the at least one processor is configured to negotiate the path with the partner network.

11. The apparatus of claim 1, wherein the at least one processor is configured to provide a representation of the WAN to the partner network, the representation including virtual network entities within the WAN associated with respective geographic locations and virtual connections between the virtual network entities within the WAN.

12. A method of connecting a wide area network (WAN) with a partner network, the WAN and the partner network being in separate administrative domains, comprising:
  receiving, at a network component within the WAN, from the partner network, a network delay profile for multiple virtual network entities within the partner network, the multiple virtual network entities including virtual network entities corresponding to at least a plurality of peering locations with the WAN, the network delay profile including at least a network metric for each of the multiple virtual network entities within the partner network;
  determining a path from the partner network through the WAN via a selected peering location of the plurality of peering locations with the WAN to a destination within the WAN based on at least the network delay profile;
  deploying a policy for an agent within the partner network, the policy identifying traffic for the destination to route through the WAN via the selected peering location; and
  routing traffic from the selected peering location to the destination along the path.

13. The method of claim 12, wherein the network delay profile includes, for one or more respective virtual network entities, at least a network metric between the respective virtual network entity and each of the virtual network entities corresponding to the plurality of peering locations.

14. The method of claim 12, wherein the partner network includes a cellular network and wherein the network delay profile includes virtual network entities corresponding to locations of cellular network nodes and network metrics between the virtual network entities corresponding to the cellular network nodes and each of the virtual network entities corresponding to the plurality of peering locations.

15. The method of claim 13, wherein the network metric for each of the virtual network entities corresponding to the plurality of peering locations includes one or more of a latency, a bandwidth, or a cost metric.

16. The method of claim 12, wherein deploying the policy for the agent within the partner network comprises configuring one or more routers within the partner network to label traffic within the partner network based on the selected peering location.

17. The method of claim 12, wherein the destination is a virtual network entity within the WAN corresponding to a second selected peering location with the partner network.

18. The method of claim 12, wherein determining a path from the partner network through the WAN comprises selecting the selected peering location based on the network delay profile and delay values for paths through the WAN from the plurality of peering locations with the WAN to the destination.

19. The method of claim 18, wherein determining the path from the partner network through the WAN comprises selecting one or more routers within the WAN based on the delay values for the paths through the WAN.

20. The method of claim 18, wherein determining the path from the partner network through the WAN comprises selecting one or more virtual network entities within the partner network based on the network delay profile.

21. The method of claim 12, wherein determining the path from the partner network through the WAN comprises negotiating the path with the partner network.

22. The method of claim 12, further comprising providing a representation of the WAN to the partner network, the representation including virtual network entities within the WAN associated with respective geographic locations and virtual connections between the virtual network entities within the WAN.

23. A method of connecting a partner network to a wide area network (WAN), the WAN and the partner network being in separate administrative domains, comprising:
  sending a network delay profile for multiple virtual network entities within the partner network to the WAN, the multiple virtual network entities including virtual network entities corresponding to at least a plurality of peering locations with the WAN, the network delay profile including at least a network metric for each of the multiple virtual network entities within the partner network;
  receiving a policy from the WAN, the policy identifying traffic for a destination within the WAN to route through the WAN and identifying a selected peering location of the plurality of peering locations with the WAN as one of the multiple virtual network entities in the network delay profile; and
  routing traffic for the destination to the selected peering location based on the policy.

24. The method of claim 23, wherein the network delay profile includes, for one or more respective virtual network entities, at least a network metric between the respective virtual network entity and each of the virtual network entities corresponding to the plurality of peering locations.

25. The method of claim 23, wherein the partner network includes a cellular network and wherein the network delay profile includes virtual network entities corresponding to locations of cellular network nodes and network metrics between the virtual network entities corresponding to the cellular network nodes and each of virtual network entities corresponding to the plurality of peering locations.

26. The method of claim 23, wherein the network metric for each of the virtual network entities corresponding to the plurality of peering locations includes one or more of a latency, a bandwidth, or a cost metric.

27. The method of claim 23, wherein routing traffic for the destination to the selected peering location based on the policy comprises configuring one or more routers within the partner network to label traffic within the partner network based on the selected peering location.

28. The method of claim 23, wherein the destination is a virtual network entity within the WAN corresponding to a second selected peering location with the WAN.

29. The method of claim 23, further comprising receiving a representation of the WAN, the representation including virtual network entities within the WAN associated with respective geographic locations and virtual connections between the virtual network entities within the WAN.

* * * * *